US008055571B2

(12) United States Patent
Sacks (10) Patent No.: US 8,055,571 B2
(45) Date of Patent: Nov. 8, 2011

(54) COMPUTERIZED METHOD FOR OPEN-ENDED INVESTMENTS

(75) Inventor: Seymour Sacks, New York, NY (US)

(73) Assignee: Sacks Equalization Model, Inc., Boynton Beach, FL (US)

( * ) Notice: Subject to any disclaimer, the term of this patent is extended or adjusted under 35 U.S.C. 154(b) by 0 days.

(21) Appl. No.: 13/088,196

(22) Filed: Apr. 15, 2011

(65) Prior Publication Data

US 2011/0196779 A1    Aug. 11, 2011

Related U.S. Application Data

(63) Continuation-in-part of application No. 12/382,022, filed on Mar. 6, 2009.

(51) Int. Cl.
*G06Q 40/00* (2006.01)
(52) U.S. Cl. ....................................................... 705/36 R
(58) Field of Classification Search ............... 705/35–45
See application file for complete search history.

(56) References Cited

U.S. PATENT DOCUMENTS

| 6,236,972 B1 | 5/2001 | Shkedy |
| 6,879,964 B2 | 4/2005 | Sauter et al. |
| 7,337,138 B2 | 2/2008 | Sauter et al. |

*Primary Examiner* — Thomas M Hammond, III
(74) *Attorney, Agent, or Firm* — Richard C. Litman (57) ABSTRACT

The investment liquidation and purchase adjustment method is an investment model for open-ended investments that takes into account the net asset value (NAV) of the mutual fund and an accumulated stock brokerage transaction commission fees. The accumulated commission fees are added to the net asset value per share prior to the purchase of shares of the mutual fund. Alternatively, the accumulated commission fees are subtracted from the net asset value per share prior to the liquidation of the shares. These additional fees flow into the assets of the mutual fund. As accumulated brokerage transaction commissions change each day because of the trading of the positions in the mutual fund, the brokerage transaction commission's percentage change on a daily basis, too. This also solves the problem of maintaining the true asset value for existing shareholders when there are share liquidations by existing shareholders, protecting the true asset value for the remaining existing shareholders.

24 Claims, 4 Drawing Sheets

COMPUTERIZED METHOD FOR OPEN-ENDED INVESTMENTS

CROSS-REFERENCE TO RELATED APPLICATION

This application is a continuation-in-part of U.S. patent application Ser. No. 12/382,022, filed Mar. 6, 2009.

BACKGROUND OF THE INVENTION

1. Field of the Invention

The present invention relates generally to financial investment management, and more specifically, to a computerized investment liquidation and purchase adjustment method for open-ended investments.

2. Description of the Related Art

The largest segment of open-ended investments is the field of mutual funds. A mutual fund is a professionally managed type of collective investment scheme that pools money from many investors and invests it in stocks, bonds, short-term money market instruments, and/or other securities. The mutual fund will have a fund manager that trades the pooled money on a regular basis. Currently, the worldwide value of all mutual funds totals more than $26 trillion.

Since 1940, there have been three basic types of investment companies in the United States: open-end funds, also known in the US as mutual funds; unit investment trusts (UITs); ETFs; and closed-end funds. Similar funds also operate in Canada. However, in the rest of the world, mutual fund is used as a generic term for various types of collective investment vehicles, such as unit trusts, open-ended investment companies (OEICs), unitized insurance funds, and undertakings for collective investments in transferable securities (UCITS).

Massachusetts Investors Trust (now MFS Investment Management) was founded on Mar. 21, 1924, and, after one year, it had 200 shareholders and $392,000 in assets. The entire industry, which included a few closed-end funds represented less than $10 million in 1924.

The stock market crash of 1929 hindered the growth of mutual funds. In response to the stock market crash, Congress passed the Securities Act of 1933 and the Securities Exchange Act of 1934. These laws require that a fund be registered with the Securities and Exchange Commission (SEC) and provide prospective investors with a prospectus that contains required disclosures about the fund, the securities themselves, and fund manager. The SEC helped draft the Investment Company Act of 1940, which sets forth the guidelines with which all SEC-registered funds today must comply.

Since the Investment Company Act of 1940, a mutual fund is one of three basic types of investment companies available in the United States. Mutual funds can invest in many kinds of securities. The most common are cash instruments, stock, and bonds, but there are hundreds of sub-categories. Stock funds, for instance, can invest primarily in the shares of a particular industry, such as technology or utilities. These are known as sector funds. Bond funds can vary according to risk (e.g., high-yield junk bonds or investment-grade corporate bonds), type of issuers (e.g., government agencies, corporations, or municipalities), or maturity of the bonds (short- or long-term). Both stock and bond funds can invest in primarily U.S. securities (domestic funds), both U.S. and foreign securities (global funds), or primarily foreign securities (international funds).

Most mutual funds' investment portfolios are continually adjusted under the supervision of a professional manager, who forecasts cash flows into and out of the fund by investors, as well as the future performance of investments appropriate for the fund and chooses those which he or she believes will most closely match the fund's stated investment objective. A mutual fund is administered under an advisory contract with a management company, which may hire or fire fund managers.

Mutual funds are subject to a special set of regulatory, accounting, and tax rules. In the U.S., unlike most other types of business entities, they are not taxed on their income as long as they distribute 90% of it to their shareholders and the funds meet certain diversification requirements in the Internal Revenue Code. Also, the type of income they earn is often unchanged as it passes through to the shareholders. Mutual fund distributions of tax-free municipal bond income are tax-free to the shareholder. Taxable distributions can be either ordinary income or capital gains, depending on how the fund earned those distributions. Net losses are not distributed or passed through to fund investors.

Running a mutual fund involves costs, including shareholder transaction costs, investment advisory fees, and marketing and distribution expenses. Funds pass along these costs to investors in a number of ways. Mutual fund fees and expenses are charges that may be incurred by investors who hold mutual funds.

Generally, unlike past performance of the fund, expenses are very predictive. Funds with high expenses ratios tend to continue to have high expenses ratios. An investor can examine a fund's "Financial Highlights" which is contained in both the periodic financial reports and the fund's prospectus, and determine a fund's expense ratio over the last five years (if the fund has five years of history). It is very hard for a fund to significantly lower its expense ratio once it has had a few years of operational history. This is because funds have both fixed and variable expenses, but most expenses are variable. Variable costs are fixed on a percentage basis. For example, assuming there are no breakpoints, a 0.75% management fee will always consume 0.75% of fund assets, regardless of any increase in assets under management. The total management fee will vary based on the assets under management, but it will always be 0.75% of assets. Fixed costs (such as rent or an audit fee) vary on a percentage basis because the lump sum rent/audit amount as a percentage will vary depending on the amount of assets a fund has acquired. Thus, most of a fund's expenses behave as a variable expense and thus, are a constant fixed percentage of fund assets. It is therefore, very hard for a fund to significantly reduce its expense ratio after it has some history. Thus, if an investor buys a fund with a high expense ratio that has some history, he/she should not expect any significant reduction.

There are 3 broad investment categories for mutual funds (equity, bond, and money market—in declining order of historical returns). That is an over simplification but adequate to explain the effect of expenses. In an equity fund where the historical gross return might be 10%, a 1% expense ratio will consume approximately 10% of the investor's return. In a bond fund where the historical gross return might be 8%, a 1% expense ratio will consume approximately 12.5% of the investor's return. In a money market fund where the historical gross return might be 5%, a 1% expense ratio will consume approximately 20% of the investor's historical total return. Thus, an investor must consider a fund's expense ratio as it relates to the type of investments a fund will hold.

Mutual funds bear expenses similar to other companies. The fee structure of a mutual fund can be divided into two or three main components: management fee, nonmanagement expense, and 12b-1/non-12b-1 fees. All expenses are expressed as a percentage of the average daily net assets of the fund.

A management fee for the fund is usually synonymous with the contractual investment advisory fee charged for the management of a fund's investments. However, as many fund companies include administrative fees in the advisory fee component, when attempting to compare the total management expenses of different funds, it is helpful to define management fee as equal to the contractual advisory fee+the contractual administrator fee. This "levels the playing field" when comparing management fee components across multiple funds.

Contractual advisory fees may be structured as "flat-rate" fees, i.e., a single fee charged to the fund, regardless of the asset size of the fund. However, many funds have contractual fees which include breakpoints, so that as the value of a fund's assets increases, the advisory fee paid decreases. Another way in which the advisory fees remain competitive is by structuring the fee so that it is based on the value of all of the assets of a group or a complex of funds rather than those of a single fund.

Apart from the management fee, there are certain non-management expenses which most funds must pay. Some of the more significant (in terms of amount) non-management expenses are: transfer agent expenses (this is usually the person you get on the other end of the phone line when you want to purchase/sell shares of a fund), custodian expense (the fund's assets are kept in custody by a bank which charges a custody fee), legal/audit expense, fund accounting expense, registration expense (the SEC charges a registration fee when funds file registration statements with it), board of directors/trustees expense (the disinterested members of the board who oversee the fund are usually paid a fee for their time spent at meetings), and printing and postage expense (incurred when printing and delivering shareholder reports).

Fees and expenses borne by the investor vary based on the arrangement made with the investor's broker. Sales loads (or contingent deferred sales loads (CDSL)) are not included in the fund's total expense ratio (TER) because they do not pass through the statement of operations for the fund. Additionally, funds may charge early redemption fees to discourage investors from swapping money into and out of the fund quickly, which may force the fund to make bad trades to obtain the necessary liquidity. For example, Fidelity Diversified International Fund (FDIVX) charges a 1 percent fee on money removed from the fund in less than 30 days.

An additional expense which does not pass through the statement of operations and cannot be controlled by the investor is brokerage transaction commissions. Brokerage transaction commissions are incorporated into the price of the fund and are reported usually 3 months after the fund's annual report in the statement of additional information. Brokerage transaction commissions are directly related to portfolio turnover (portfolio turnover refers to the number of times the fund's assets are bought and sold over the course of a year). Usually the higher the rate of the portfolio turnover, the higher the brokerage transaction commissions. The advisors of mutual fund companies are required to achieve "best execution" through brokerage arrangements so that the commissions charged to the fund will not be excessive.

According to data from Greenwich Associates presented in testimony to the House Committee on Financial Services (Harold Bradley of American Century Management, Mar. 12, 2003), mutual funds pay an average of between 5.1 and 5.5 cents per share in commissions to make securities transactions—a rate that has not changed significantly in the past decade.

Existing shareholders in open-ended investment vehicles such as mutual funds, ETFs, hedge funds, etc., are continuously and dually monetarily disadvantaged when new shares or units are purchased by new investors. Additionally, the same situation occurs when exiting shareholders redeem their shares in the investment vehicle.

New shares in existing mutual funds are bought without consideration to the brokerage transaction commissions (or trading costs) that were paid in acquiring the fund's existing portfolio, thus giving the new investors a slight price advantage, and at the same time creating a slight price disadvantage to existing shareholders.

Thus, a computerized method for open-ended investments solving the aforementioned problems is desired.

SUMMARY OF THE INVENTION

The investment liquidation and purchase adjustment method includes the steps of providing a computer processor, providing computer readable memory in communication with the computer processor, and providing a computer display in communication with the computer processor. It should be understood that the purchase is being made by a client as purchaser, and the same goes for liquidation. The investment liquidation and purchase adjustment method is utilized when liquidating or purchasing shares (particularly, for open-ended investments), and includes the steps of calculating a total net asset of a mutual fund, determining a number of shares outstanding for the mutual fund, and calculating a net asset value per share for the mutual fund. It should be understood that the mutual fund is used only as an example of an open-ended investment.

In the method of purchasing shares, total net assets of a mutual fund are first calculated. The number of shares outstanding for the mutual fund is then determined and a net asset value per share for the mutual fund is calculated. A brokerage transaction commission, which is a set of fees inherent in the open-ended investment process, is then added onto the net asset value per share, and the new net assets are calculated. The new outstanding shares are then determined, and the new net asset value per share for the mutual fund is finally determined.

Similarly, in the computerized investment liquidation adjustment method, the total net assets of the mutual fund are initially calculated. The number of shares outstanding for the mutual fund is then determined and a net asset value per share for the mutual fund is calculated. The brokerage transaction commission is then subtracted from the net asset value per share, and the new net assets are calculated. The new outstanding shares are then determined, and the new net asset value per share for the mutual fund is finally determined.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
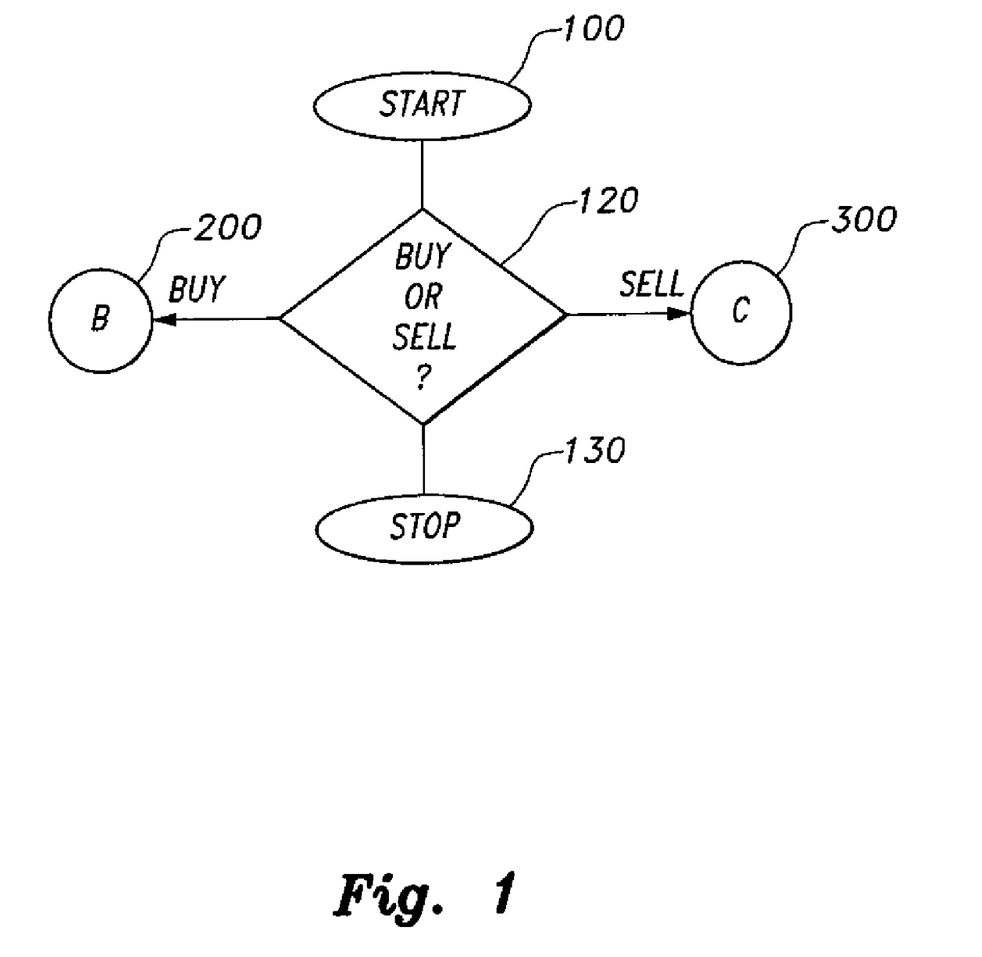
FIG. 1 is a flowchart of an investment liquidation and purchase adjustment method according to the present invention.
Figure 2:
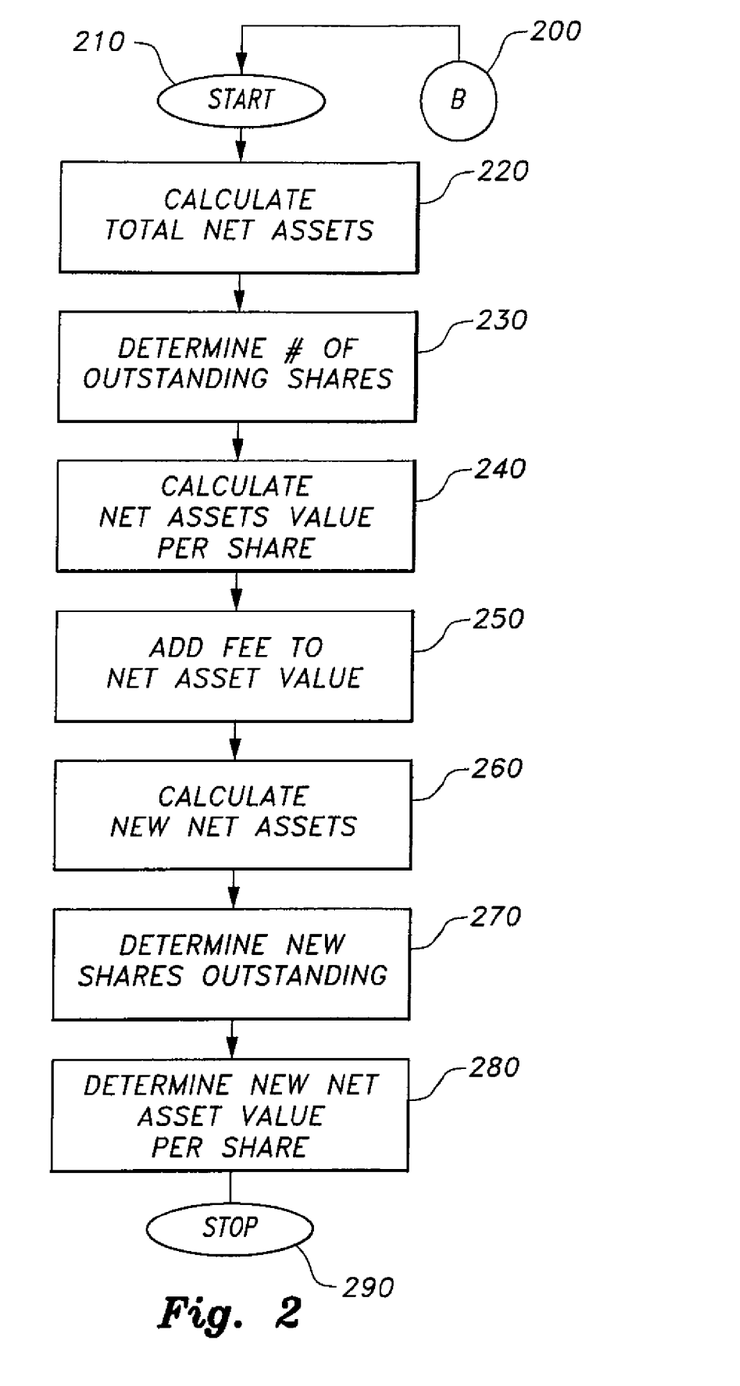
FIG. 2 is a flowchart of an investment purchase adjustment method according to the present invention.
Figure 3:
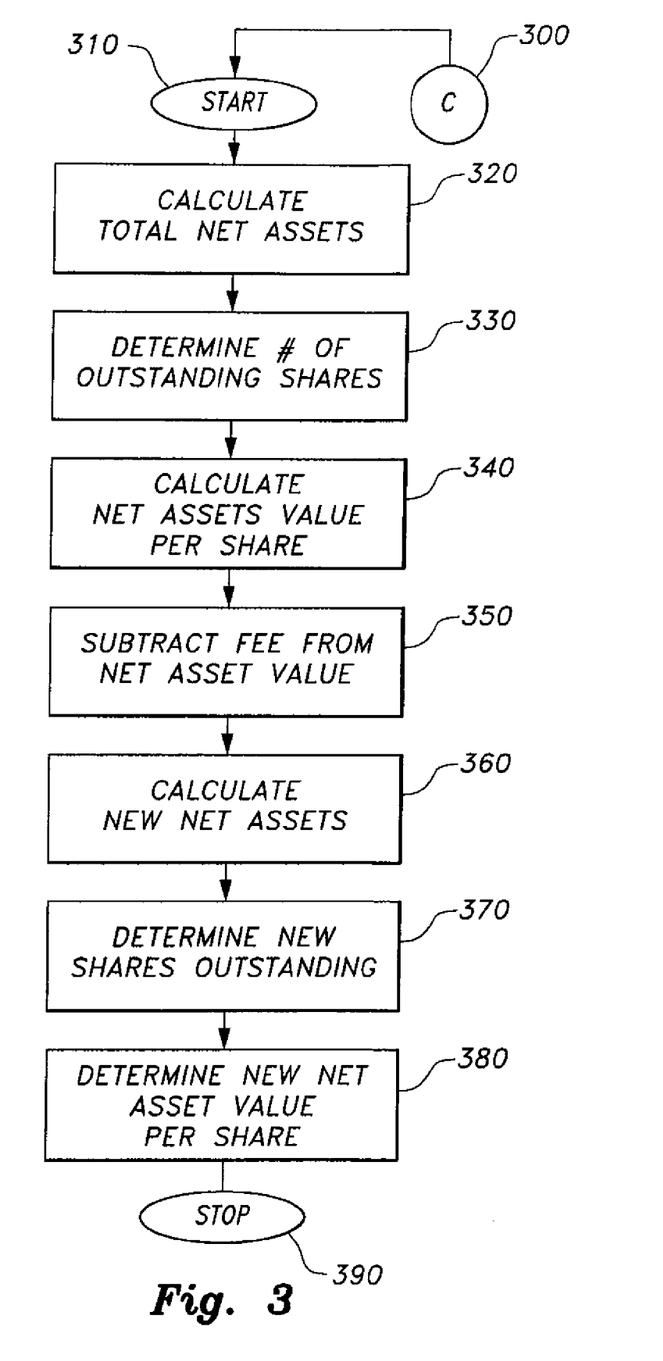
FIG. 3 is a flowchart of an investment liquidation adjustment method according to the present invention.

The present invention, with a view to FIGS. 1-3, relates generally to an open-ended investment model. More specifically, the invention is a method for calculating a net asset value per share, with or without an added brokerage transaction commission, and charging individual shareholders upon purchase or liquidation of shares of the mutual fund, rather than removing brokerage transaction fees, etc. from all shareholders in the mutual fund.

Investors who want to sell shares of a closed-end fund can do so at any time that the stock exchange is open at the then-current market price. The market price of a closed-end fund's shares differ from, and are often well below, the NAV of those shares. Shares of open-end funds and UIT's, by contrast, can be redeemed only at the NAV determined at the end of the day.

A net asset value, or NAV, is the current market value of a fund's holdings, less the fund's liabilities, usually expressed as a per-share amount. For most funds, the NAV is determined daily, after the close of trading on some specified financial exchange, but some funds update their NAV multiple times during the trading day. Typically, but not in all situations, the public offering price, or POP, is the NAV plus a sales charge. Open-end funds sell shares at the POP and redeem shares at the NAV, and so process orders only after the NAV is determined. Closed-end funds (the shares of which are traded by investors) may trade at a higher or lower price than their NAV; this is known as a premium or discount, respectively. If a fund is divided into multiple classes of shares, each class will typically have its own NAV, reflecting differences in fees and expenses paid by the different classes.

Net Asset Value (NAV) is a term used to describe the value of an entity's assets less the value of its liabilities. The term is commonly used in relation to collective investment schemes. It may also be used as a synonym for the book value of a firm. For collective investment schemes (such as US mutual funds and hedge funds), the NAV is the total value of the fund's portfolio less its liabilities. Its liabilities may be money owed to lending banks or fees owed to investment managers, for example.

Investment companies are corporations or trusts that are in the business of buying and selling securities. Such companies issue shares that are bought by investors. The value of an investment company's shares is measured, by adding up the value of the securities it owns (and any other assets), subtracting liabilities, and dividing by the number of outstanding shares. This figure is known as the investment company's "net asset value" (NAV). It is typically calculated once per day, at the close of the financial markets.

For the valuation of assets and liabilities, different methods are used depending upon the circumstances, the purposes of the valuation or the regulations that may apply. For funds, the most common method of valuation is to use the market value of the assets. The NAV describes the company's current asset and liability position.

Existing shareholders in open-ended investment vehicles such as mutual funds, ETFs, hedge funds, etc., are continuously and dually monetarily disadvantaged, when new shares are purchased by new investors (as will be described in detail below). Additionally, the same situation occurs when exiting shareholders redeem their shares in the investment vehicle.

Referring to FIGS. 1-3, the method of the present invention is discussed. Of course, as will be evident, the following examples refer to mutual funds, even though the method would also be relevant to all open-ended investment vehicles. Additionally, in these examples sales charges, if any, have been omitted.

Currently, new shares in existing mutual funds are bought without consideration to the brokerage transaction commissions (or trading costs) that were paid in acquiring the fund's existing portfolio, thus giving the new investors a slight price advantage, and at the same time creating a slight price disadvantage to existing shareholders.

For example, a new mutual fund is started whereby the original investors buy 1,000,000 shares at $10.00 per share for the total amount of $10,000,000.00. If the mutual fund manager invests, the full $10,000,000.00, and assuming that the stock brokerage transaction commission average is 0.5%, and assuming the portfolio assets remain unchanged, then the next day's asset value would change to $9.95 per share ($10,000,00 less 0.5%=$9,950,000, divided by 1,000,000 shares=$9.95 per share).

In the above example, after the original investors paid the $10.00 offering price, the new investors would pay $9.95 per share, 0.5% less than then the original investors. This discrepancy will always exist when new shares are purchased.

With reference to FIG. 1, with respect to the present invention, the initial choice, starting with 100, that the pending shareholder has to answer is whether they are buying shares or liquidating shares and this is indicated with decision block 120. If the shareholder is buying shares of the mutual fund, the shareholder is directed to block 200 or, more specifically, to FIG. 2. Alternatively, If the shareholder is liquidating shares of the mutual fund, the shareholder is directed to block 300 or, more specifically, to FIG. 3.

Since in the first example, the shareholder is purchasing more shares, attention is directed to FIG. 2 and to rectify the above discrepancy solution would be to charge new investors the 0.5025125% fee for their portion of the existing brokerage transaction commissions, so they would pay the same $10.00 per share as the existing shareholders.

Initially, the total net assets have to be calculated in box 220. Next, a determination of the number of shares outstanding is found in box 230. Now, the Net Asset Value or NAV per share is calculated in box 240.

At this point, in box 250, the calculation of the fee would be to add 0.5025125% on to the shareholders purchasing the shares. It should be understood that the 0.5025125% is used as an exemplary percentage. The calculation of this fee would flow into the assets of the mutual fund. As accumulated brokerage transaction commissions change each day because of the trading of the positions in the mutual fund, the brokerage transaction commission's percentage could be changed on a daily basis. In box 260 the new net assets are calculated and, in box 270, the new outstanding shares are determined. Finally, the new net asset value per share is determined, in box 280 and the shares are sold to the shareholder.

As shown in FIG. 3, the method can be similarly used to solve the problem of maintaining the true asset value of existing shareholders when there are share liquidations by some existing shareholders.

By way of example, currently when existing shareholders redeem shares in a mutual fund, the shares are liquidated at net asset value. This liquidation does not taking into account any brokerage transaction commissions that would ultimately occur on the assets of the liquidated positions.

For example, a mutual fund has $9,950,00 in net assets with 1,000,000 shares outstanding or a net asset value of $9.95 per share. Liquidating shareholders would redeem their shares at $9.95 per share, leaving the remaining shareholders in the mutual fund assuming any present or future brokerage transaction commissions related to the redemptions.

Using similar figures, for a purchase, after the original investors paid the $10.00 offering price, the new investors would pay $9.95 per share, 0.5% less than then the original investors. This discrepancy will always exist when new shares are purchased.

With reference to FIG. 1 again, the initial choice, starting with 100, that the new shareholder has to answer is whether they are buying shares or liquidating shares and this is indicated with decision block 120. If the shareholder is buying shares of the mutual fund, the shareholder is directed to block 200 or, more specifically, to FIG. 2. Alternatively, if the shareholder is liquidating shares of the mutual fund, the shareholder is directed to block 300 or, more specifically, to FIG. 3.

Since in the above example, the shareholder is selling or liquidating more shares, attention is directed to FIG. 3 and to rectify the above discrepancy solution would be to charge new investors the 0.5025125% fee for their portion of the existing brokerage transaction commissions, so they would pay the same $10.00 per share as the existing shareholders.

Initially, the total net assets have to be calculated in box 320. Next, a determination of the number of shares outstanding is found in box 330. Now, the Net Asset Value or NAV per share is calculated in box 340.

At this point, in box 350, the calculation of the fee would be to subtract 0.5% from the new shareholders. The calculation of this fee would flow into the assets of the mutual fund. As accumulated brokerage transaction commissions change each day because of the trading of the positions in the mutual fund, the brokerage transaction commission's percentage could be changed on a daily basis.

In box 360 the new net assets are calculated and, in box 370, the new outstanding shares are determined. Finally, the new net asset value per share is determined, in box 380 and the shares are sold. Thus, the liquidating shareholders would be charged their portion of the assumed brokerage charges (in this case 0.5%). They would receive $9.95 less 0.4975 cents=$9.90025 per share. The 0.5% would flow into the assets of the mutual fund.

The method of the present invention would protect the true asset value of existing shareholders in an open-ended vehicle, and not economically penalize them on a continuous basis whenever shares are bought by new investors or redeemed by existing ones.

As noted above, the daily stock brokerage expenses that are charged for the buying and the redemption of the mutual fund may be calculated on a daily basis. Alternatively, the expenses may be calculated using a static percentage, such as 0.5%, for example, on a daily basis that approximates the stock brokerage charges, with this percentage changing periodically. Using the example given above for a closing total net asset of the fund being $9,950,000, the stock brokerage transaction commissions to assemble this existing portfolio would be $49,750, or 0.5% of the total net assets. The purchasers of shares of this fund the next day would be charged an additional 0.5025125% on their purchases. These charges would flow to the assets of the fund. Shareholders who redeem their shares the next day would have 0.5% deducted from their proceeds, which would then flow to the assets of the fund. Alternatively, the mutual fund could calculate the expenses on a daily basis based upon the stock brokerage transaction commissions paid on their existing portfolio, and this would be adjusted accordingly on a daily basis. Once again, using the examples set forth above, if the closing total net assets of the fund are $8,770,123, then the stock brokerage transaction commissions to assemble the existing portfolio would be $28,064, or 0.32% of the total net assets. The purchasers of shares of this fund the following day would then be charged an additional 0.32103% on their purchases. These charges would flow to the assets of the fund. Shareholders who redeem their shares the next day would have 0.32% deducted from their proceeds, which would then flow to the assets of the fund.

Using the examples given above, under the prior art method for redemption of shares, the total net assets of a mutual fund, assuming 0.5% in accumulated stock brokerage transaction commissions, is $9,950,000, with 1,000,000 shares outstanding and a net asset value per share of $9.95. For 100,000 shares redeemed at $9.95 per share, this yields $995,000, with the new net assets of the mutual fund being $8,955,000, with 900,000 new shares outstanding, thus yielding a new net asset value per share of $9.95. Using the present inventive method, the 100,000 shares are redeemed at $9.90025 per share (as opposed to the prior art value of $9.95), which is calculated by the 0.5% brokerage transaction fee being deducted from the net asset value per share. This results in a new net asset value of the mutual fund equal to $8,959,975, which for 900,000 new outstanding shares results in a new net asset value per share of $9.956 per share, which is greater by 6/10 of a cent than in the prior art system.

Similarly, for buying of new shares, the total net assets of the prior art mutual fund, assuming 0.5% in accumulated stock brokerage transaction commissions, is $9,950,000, with 1,000,000 shares outstanding and a net asset value per share of $9.95. For 100,000 shares purchased at $9.95 per share, this yields $995,000, with the new net assets of the mutual fund being $10,945,000, with 1,100,000 new shares outstanding, thus yielding a new net asset value per share of $9.95. Using the present inventive method, the 100,000 shares are purchased at $10.00 per share (as opposed to the prior art value of $9.95), which is calculated by the 0.525125% brokerage fee being added to the net asset value. This results in a new net asset value of the mutual fund equal to $10,950,000, which for 1,100,000 new outstanding shares results in a new net asset value per share of $9.95 per share. It should be understood that the mutual fund examples given above are shown merely as examples of open-ended investments, and the present inventive method may be applied to any suitable type of open-ended investment.

Figure 4:
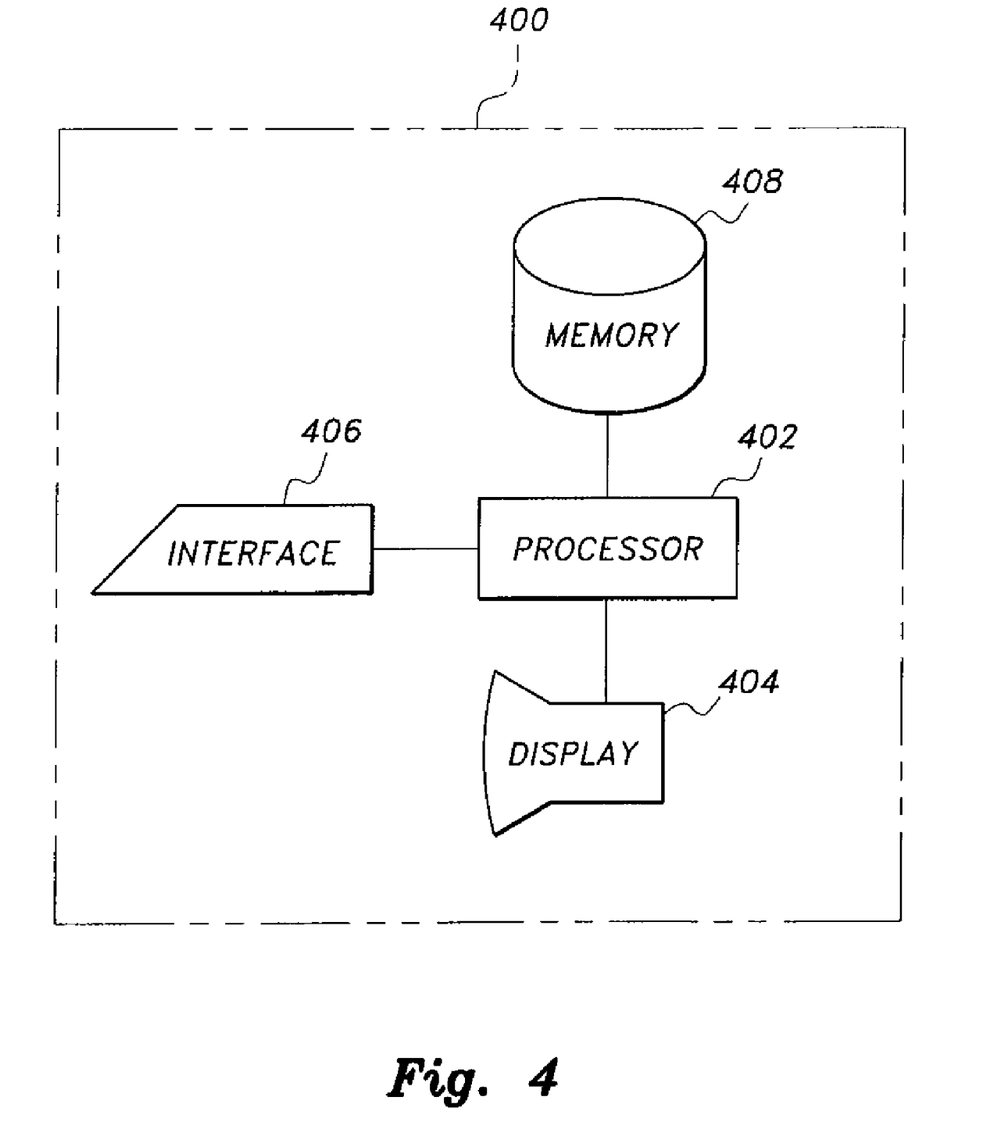
FIG. 4 is a block diagram illustrating system components for implementing the investment liquidation and purchase adjustment method according to the present invention.

It should be understood that the calculations may be performed by any suitable computer system, such as that diagrammatically shown in FIG. 4. Data is entered into system 400 via any suitable type of user interface 406, and may be stored in memory 408, which may be any suitable type of computer readable and programmable memory. Calculations are performed by processor 402, which may be any suitable type of computer processor and may be displayed to the user on display 404, which may be any suitable type of computer display.

Processor 402 may be associated with, or incorporated into, any suitable type of computing device, for example, a personal computer or a programmable logic controller. The display 404, the processor 402, the memory 408 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 408, or in place of memory 408, include a hard disk device (HDD), a flexible disk (ED), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiment described above, but encompasses any and all embodiments within the scope of the following claims.

I claim:

1. A computerized investment purchase adjustment method, comprising the steps of:
   calculating, using a computer processor, total net assets of a mutual fund and storing the calculated total net assets of the mutual fund in a database stored in computer readable memory;
   calculating, using the computer processor, a number of shares outstanding for the mutual fund and storing the calculated number of shares outstanding for the mutual fund in the database stored in the computer readable memory;
   calculating, using the computer processor, a net asset value per share for the mutual fund and storing the calculated net asset value per share for the mutual fund in the database stored in the computer readable memory;
   re-calculating, using the computer processor, the net asset value per share for the mutual fund by adding a brokerage transaction commission onto the net asset value per share for the mutual fund stored in the database in the computer readable memory;
   storing, using the computer processor, the re-calculated net asset value per share for the mutual fund in the database in the computer readable memory;
   re-calculating, using the computer processor, the total net assets of the mutual fund based upon the re-calculated net asset value per share for the mutual fund, and storing the re-calculated total net assets of the mutual fund in the database stored in the computer readable memory;
   re-calculating, using the computer processor, the number of shares outstanding for the mutual fund based upon the re-calculated net asset value per share for the mutual fund, and storing the re-calculated number of shares outstanding for the mutual fund in the database stored in the computer readable memory;
   re-calculating, using the computer processor, the net asset value per share for the mutual fund based upon the re-calculated number of shares outstanding for the mutual fund and the re-calculated total net assets of the mutual fund, and storing the re-calculated net asset value per share for the mutual fund in the database stored in the computer readable memory;
   displaying, using the computer processor, the re-calculated net asset value per share; and
   buying, using the computer processor, the shares of the mutual fund at the re-calculated net asset value per share.

2. The computerized investment purchase adjustment method according to claim 1, wherein the brokerage transaction commission added to the net asset value per share is 0.5025125%.

3. The computerized investment purchase adjustment method according to claim 1, wherein the brokerage transaction commission is calculated using a fixed percentage.

4. The computerized investment purchase adjustment method according to claim 3, wherein the brokerage transaction commission is calculated daily.

5. The computerized investment purchase adjustment method according to claim 1, wherein the brokerage transaction commission is calculated as a percentage based upon commissions paid on an existing portfolio.

6. The computerized investment purchase adjustment method according to claim 5, wherein the brokerage transaction commission is selectively adjusted on a daily basis.

7. A computerized investment liquidation adjustment method, comprising the steps of:
   calculating, using a computer processor, total net assets of a mutual fund and storing the calculated total net assets of the mutual fund in a database stored in computer readable memory;
   calculating, using the computer processor, a number of shares outstanding for the mutual fund and storing the calculated number of shares outstanding for the mutual fund in the database stored in the computer readable memory;
   calculating, using the computer processor, a net asset value per share for the mutual fund and storing the calculated net asset value per share for the mutual fund in the database stored in the computer readable memory;
   re-calculating, using the computer processor, the net asset value per share for the mutual fund by subtracting a brokerage transaction commission from the net asset value per share for the mutual fund stored in the database in the computer readable memory;
   storing, using the computer processor, the re-calculated net asset value per share for the mutual fund in the database in the computer readable memory;
   re-calculating, using the computer processor, the total net assets of the mutual fund based upon the re-calculated net asset value per share for the mutual fund, and storing the re-calculated total net assets of the mutual fund in the database stored in the computer readable memory;
   re-calculating, using the computer processor, the number of shares outstanding for the mutual fund based upon the re-calculated net asset value per share for the mutual fund, and storing the re-calculated number of shares outstanding for the mutual fund in the database stored in the computer readable memory;
   re-calculating, using the computer processor, the net asset value per share for the mutual fund based upon the re-calculated number of shares outstanding for the mutual fund and the re-calculated total net assets of the mutual fund, and storing the re-calculated net asset value per share for the mutual fund in the database stored in the computer readable memory;
   displaying, using the computer processor, the re-calculated net asset value per share; and
   selling, using the computer processor, the shares of the mutual fund at the re-calculated net asset value per share.

8. The computerized investment liquidation adjustment method according to claim 7, wherein the brokerage transaction commission subtracted from the net asset value per share is 0.5%.

9. The computerized investment liquidation adjustment method according to claim 7, wherein the brokerage transaction commission is calculated using a fixed percentage.

10. The computerized investment liquidation adjustment method according to claim 9, wherein the brokerage transaction commission is calculated daily.

11. The computerized investment liquidation adjustment method according to claim 7, wherein the brokerage transaction commission is calculated as a percentage based upon commissions paid on an existing portfolio.

12. The computerized investment liquidation adjustment method according to claim 11, wherein the brokerage transaction commission is selectively adjusted on a daily basis.

13. A computer software product that includes a non-transitory storage medium readable by a processor, the non-transitory storage medium having stored thereon a set of instructions for performing investment purchase adjustment, the instructions comprising:
- (a) a first sequence of instructions which, when executed by the processor, causes the processor to calculate total net assets of a mutual fund and store the calculated total net assets of the mutual fund in a database stored in computer readable memory;
- (b) a second sequence of instructions which, when executed by the processor, causes the processor to calculate a number of shares outstanding for the mutual fund and store the calculated number of shares outstanding for the mutual fund in the database stored in the computer readable memory;
- (c) a third sequence of instructions which, when executed by the processor, causes the processor to calculate a net asset value per share for the mutual fund and store the calculated net asset value per share for the mutual fund in the database stored in the computer readable memory;
- (d) a fourth sequence of instructions which, when executed by the processor, causes the processor to re-calculate the net asset value per share for the mutual fund by adding a brokerage transaction commission onto the net asset value per share for the mutual fund stored in the database in the computer readable memory;
- (e) a fifth sequence of instructions which, when executed by the processor, causes the processor to store the re-calculated net asset value per share for the mutual fund in the database in the computer readable memory;
- (f) a sixth sequence of instructions which, when executed by the processor, causes the processor to re-calculate the total net assets of the mutual fund based upon the re-calculated net asset value per share for the mutual fund, and store the re-calculated total net assets of the mutual fund in the database stored in the computer readable memory;
- (g) a seventh sequence of instructions which, when executed by the processor, causes the processor to re-calculate the number of shares outstanding for the mutual fund based upon the re-calculated net asset value per share for the mutual fund, and store the re-calculated number of shares outstanding for the mutual fund in the database stored in the computer readable memory;
- (h) an eighth sequence of instructions which, when executed by the processor, causes the processor to re-calculate the net asset value per share for the mutual fund based upon the re-calculated number of shares outstanding for the mutual fund and the re-calculated total net assets of the mutual fund, and store the re-calculated net asset value per share for the mutual fund in the database stored in the computer readable memory; and
- (i) a ninth sequence of instructions which, when executed by the processor, causes the processor to buy the shares of the mutual fund at the re-calculated net asset value per share.

14. The computer software product according to claim 13, wherein the brokerage transaction commission added to the net asset value per share in the fourth set of instructions is 0.5025125%.

15. The computer software product according to claim 13, wherein the instructions further comprise a tenth sequence of instructions which, when executed by the processor, causes the processor to calculate the brokerage transaction commission using a fixed percentage.

16. The computer software product according to claim 15, wherein the instructions further comprise an eleventh sequence of instructions which, when executed by the processor, causes the processor to calculate the brokerage transaction commission daily.

17. The computer software product according to claim 13, wherein the instructions further comprise a twelfth sequence of instructions which, when executed by the processor, causes the processor to calculate the brokerage transaction commission as a percentage based upon commissions paid on an existing portfolio.

18. The computer software product according to claim 17, wherein the instructions further comprise a thirteenth sequence of instructions which, when executed by the processor, causes the processor selectively adjust the brokerage transaction commission on a daily basis.

19. A computer software product that includes a non-transitory storage medium readable by a processor, the non-transitory storage medium having stored thereon a set of instructions for performing investment liquidation adjustment, the instructions comprising:
- (a) a first sequence of instructions which, when executed by the processor, causes the processor to calculate total net assets of a mutual fund and store the calculated total net assets of the mutual fund in a database stored in computer readable memory;
- (b) a second sequence of instructions which, when executed by the processor, causes the processor to calculate a number of shares outstanding for the mutual fund and store the calculated number of shares outstanding for the mutual fund in the database stored in the computer readable memory;
- (c) a third sequence of instructions which, when executed by the processor, causes the processor to calculate a net asset value per share for the mutual fund and store the calculated net asset value per share for the mutual fund in the database stored in the computer readable memory;
- (d) a fourth sequence of instructions which, when executed by the processor, causes the processor to re-calculate the net asset value per share for the mutual fund by subtracting a brokerage transaction commission from the net asset value per share for the mutual fund stored in the database in the computer readable memory;
- (e) a fifth sequence of instructions which, when executed by the processor, causes the processor to store the re-calculated net asset value per share for the mutual fund in the database in the computer readable memory;
- (f) a sixth sequence of instructions which, when executed by the processor, causes the processor to re-calculate the total net assets of the mutual fund based upon the re-calculated net asset value per share for the mutual fund, and store the re-calculated total net assets of the mutual fund in the database stored in the computer readable memory;
- (g) a seventh sequence of instructions which, when executed by the processor, causes the processor to re-calculate the number of shares outstanding for the mutual fund based upon the re-calculated net asset value per share for the mutual fund, and store the re-calculated number of shares outstanding for the mutual fund in the database stored in the computer readable memory; and (h) an eighth sequence of instructions which, when executed by the processor, causes the processor to re-calculate the net asset value per share for the mutual fund based upon the re-calculated number of shares outstanding for the mutual fund and the re-calculated total net assets of the mutual fund, and store the re-calculated net asset value per share for the mutual fund in the database stored in the computer readable memory; and (i) a ninth sequence of instructions which, when executed by the processor, causes the processor to sell the shares of the mutual fund at the re-calculated net asset value per share.

20. The computer software product according to claim 19, wherein the brokerage transaction commission added to the net asset value per share in the fourth set of instructions is 0.5025125%.

21. The computer software product according to claim 19, wherein the instructions further comprise a tenth sequence of instructions which, when executed by the processor, causes the processor to calculate the brokerage transaction commission using a fixed percentage.

22. The computer software product according to claim 21, wherein the instructions further comprise an eleventh sequence of instructions which, when executed by the processor, causes the processor to calculate the brokerage transaction commission daily.

23. The computer software product according to claim 19, wherein the instructions further comprise a twelfth sequence of instructions which, when executed by the processor, causes the processor to calculate the brokerage transaction commission as a percentage based upon commissions paid on an existing portfolio.

24. The computer software product according to claim 23, wherein the instructions further comprise a thirteenth sequence of instructions which, when executed by the processor, causes the processor selectively adjust the brokerage transaction commission on a daily basis.

* * * * *